HANDLY B. KIMBALL, OF CHARLOTTE, MICHIGAN.

Letters Patent No. 84,699, dated December 8, 1868.

MODE OF APPLYING CRYSTAL FROSTING TO GLASS.

The Schedule referred to in these Letters Patent and making part of the same.

*To all whom it may concern:*

Be it known that I, HANDLY B. KIMBALL, of Charlotte, in the county of Eaton, and State of Michigan, have invented a new and useful application and adaptation of the property of crystallization in certain bodies, for depositing and preserving an efflorescence upon the surface of glass, and make it more or less opaque and ornamental; and I do hereby declare that the following is a full, clear, and exact description of the same.

This fixed ornamentation of glass I denominate "Crystal Frosting," and design its use, more especially, for window-lights, to lessen their transparency, and produce a cooling effect, by reason of the association of ideas with the efflorescence produced on glass by frost in extremely cold weather.

I employ, for my crystal frosting, any of the crystallizable salts which will readily dissolve in soft water, and, when spread over the surface of glass, will effloresce in a sufficiently ornamental manner while drying.

I find the following to be the best solutions for producing imitations of the effect of frost upon glass, to wit:

No. 1. As much oxalic acid as can be held in solution in pure soft water.

No. 2. One part of sulphate of magnesia, dissolved in about four parts of soft water.

No. 3. Sugar of lead, in soft water, same proportion as in No. 2.

After cleaning the glass to be "frosted," I flow one side of it with the solution, and, provided I wish the development of a full and uniform efflorescence over the whole surface, I place it in a horizontal position, and allow full time for the crystals to form, while the solution is slowly drying in a moderate temperature.

If dried quickly in a high temperature, the crystals are shorter and more compact, and in this way an effect may be produced resembling ground glass, or that produced in the old style of "frosting," viz, by pouncing a thin layer of white-lead paint.

This difference in the crystal formations enables the operator, by a skilful manipulation with a spirit-lamp, (or in any other convenient manner, causing the solution on the glass to dry irregularly,) to produce a beautifully-diversified effect, in infinite variety, on the glass.

My crystal frosting may be tinted with any suitable coloring-matter that will readily mix with any of the solutions before they are spread on the glass, some of the aniline dyes producing a fine effect.

After the solutions are thoroughly dried, in manner substantially as aforesaid, I cover and protect the crystalline formations with one or more coats of the best copal, dammar, or other suitable transparent varnish, which becomes hard when dry, so as to bear rubbing or washing, and the process of manufacture is complete.

Having described my invention,

What I claim as new, and desire to secure by Letters Patent, is the following:

I claim, as a new article of manufacture, the "crystal frosting" on window-glass, produced by flowing one side with any suitable efflorescing-solution, and protecting the efflorescence, when fully dry, with copal or other suitable varnish, substantially in the manner, and for the purpose herein specified

HANDLY B. KIMBALL.

Witnesses:
A. A. WOOD,
J. J. RICHARDSON.